(12) United States Patent
Hammer et al.

(10) Patent No.: US 9,458,955 B2
(45) Date of Patent: Oct. 4, 2016

(54) COMPOSITE WASTE AND WATER TRANSPORT ELEMENTS AND METHODS OF MANUFACTURE FOR USE ON AIRCRAFT

(71) Applicant: MAG AEROSPACE INDUSTRIES, INC., Carson, CA (US)

(72) Inventors: Jason Hammer, Mukilteo, WA (US); Mohan Muttur, Bothell, WA (US)

(73) Assignee: MAG Aerospace Industries, LLC, Carson, CA (US)

( * ) Notice: Subject to any disclaimer, the term of this patent is extended or adjusted under 35 U.S.C. 154(b) by 565 days.

(21) Appl. No.: 13/945,940

(22) Filed: Jul. 19, 2013

(65) Prior Publication Data

US 2014/0023812 A1    Jan. 23, 2014

Related U.S. Application Data

(60) Provisional application No. 61/673,863, filed on Jul. 20, 2012.

(51) Int. Cl.
| | |
|---|---|
| *F16L 9/127* | (2006.01) |
| *B29D 23/00* | (2006.01) |
| *F16L 9/133* | (2006.01) |
| *F16L 9/12* | (2006.01) |
| *B29C 33/52* | (2006.01) |
| *B29C 70/30* | (2006.01) |
| *F16L 9/128* | (2006.01) |
| *B29C 67/00* | (2006.01) |
| *F16L 43/00* | (2006.01) |
| *B29L 23/00* | (2006.01) |

(52) U.S. Cl.
CPC ............. *F16L 9/127* (2013.01); *B29C 33/52* (2013.01); *B29C 67/0055* (2013.01); *B29C 70/30* (2013.01); *B29D 23/00* (2013.01); *F16L 9/12* (2013.01); *F16L 9/128* (2013.01); *F16L 9/133* (2013.01); *F16L 43/008* (2013.01); *B29L 2023/004* (2013.01); *Y10T 428/139* (2015.01); *Y10T 428/1393* (2015.01)

(58) Field of Classification Search
CPC ............ F16L 9/12; F16L 9/127; F16L 9/128; F16L 9/133; Y10T 428/139; Y10T 428/1393
See application file for complete search history.

(56) References Cited

FOREIGN PATENT DOCUMENTS

| | | |
|---|---:|---|
| DE | 4402984 A1 | 8/1995 |
| FR | 2942018 A1 | 8/2010 |
| JP | 2000061959 A | 2/2000 |
| WO | 90/08637 A1 | 8/1990 |
| WO | 2009/155491 A2 | 12/2009 |
| WO | 2013/126981 A1 | 9/2013 |

OTHER PUBLICATIONS

International Patent Application No. PCT/US2013/051181, International Preliminary Report on Patentability dated Jan. 29, 2015.
PCT/US2013/051181, International Search Report and Written Opinion, Jan. 29, 2014, 12 pages.

*Primary Examiner* — Walter B Aughenbaugh
(74) *Attorney, Agent, or Firm* — Kilpatrick Townsend & Stockton LLP; Dean W. Russell; Kristin M. Crall

(57) ABSTRACT

Embodiments of the present invention provide composite waste and water transport elements that can be designed having various unique shapes and methods for their manufacture.

11 Claims, 5 Drawing Sheets

COMPOSITE WASTE AND WATER TRANSPORT ELEMENTS AND METHODS OF MANUFACTURE FOR USE ON AIRCRAFT

CROSS REFERENCE TO RELATED APPLICATIONS

This application claims the benefit of U.S. Provisional Application Ser. No. 61/673,863, filed Jul. 20, 2013, titled "Composite Waste and Water Tubes (Transport Elements) For Use on Aircraft and Other Passenger Transport Vehicles," the entire contents of which are hereby incorporated by reference.

FIELD OF THE INVENTION

Embodiments of the present invention relate generally to composite waste and water transport elements that can be designed having various unique shapes and methods for their manufacture.

BACKGROUND

There are generally two types of liquid delivery tubes used on board an aircraft or other aerospace vehicle—vacuum waste tubes and tubes used to carry potable water from a potable water tank to a hand washing station, sink, or other water-using apparatus. Both types of water tubes are typically made out of corrosion resistant steel (CRES) thin walled tubing. For example, current vacuum waste tubes are typically titanium thin walled (0.020" to 0.028") tubes of diameters from one to four inches in diameter. In some situations, corrosion resistant steel (CRES) thin walled tubing, which is about 0.020" to 0.035" in wall thickness, is used. These tubes are used because these metals meet all aerospace requirements for transport elements (temperature, chemical exposure, structural, impact, and other requirements). Tubes used for the vacuum waste system are primarily straight tubes, which also incorporate bends and wyes (manifolds, pullouts, tees, and so forth). FIG. 1 shows a waste tube which has a wye (pullout) and various bends. Typically, a straight wall titanium tube is bent as required and wyes are welded and fittings (AS1650 style) are swaged or welded to tube ends. In some cases, a beaded end is used per AS5131 in place of the welded fittings.

In the event that a hard object (such as a battery, a cell phone, or other flushable object that is not intended to traverse a vacuum sewer line) is flushed into the vacuum waste system, becoming a projectile, the impact at bends or wyes could break the tube and lead to system failure. Titanium waste tubes are generally used because they are lightweight and handle impact requirements and the vacuum pressure (typically 0 to −11 PSID) cycling of the vacuum waste system. CRES tubes also meet this requirement and while they are less costly, the weight of CRES increases over titanium. CRES (which has a density of about 0.29 lbs/in$^3$) is approximately 60% heavier than titanium (which has a density of about 0.163 lbs/in$^3$).

The other types of water tubes on an aircraft, potable water tubes (e.g., the tubes that for transporting potable water throughout the aircraft), are typically CRES thin walled (0.020" to 0.035") tubes of diameters from about a half inch to about 5 inches in diameter. Titanium may also be used when a lightweight system is required and higher cost is feasible. For areas where complex routing (bends) is required, flexible hoses (for example, AS4468, AS5420 or similar) are used. Water tubes do not have an internal impact requirement but must meet potability requirements (NSF/ANSI Standard 61 or equivalent) and have pressure requirements of 125 PSID proof and 188 PSID burst.

Potable water tubes used are primarily straights, wye (pullout, manifold, tee) and bends. FIG. 2 shows a typical water tube straight with a pullout. Typically, if a straight tube needs to be bent, wyes are welded and fittings (AS1650 style) are brazed or welded to tube ends. Since tube diameters are relatively small, CRES is used in place of titanium for cost savings. Titanium would decrease weight but increase cost.

However, it is desirable to provide waste and water tubes of other materials that are lightweight, that meet the required strength and impact requirements, and that can be manufactured in the desired configurations. In some instances, it is desirable to manufacture tubes with varying diameters, varying lengths, shapes, and curvatures. For example, because the aircraft or other passenger transport vehicle may demand a tortuous waste or water route, the tubes should be designed in such a way that they can have bends or turns easily formed therein. It is also desirable to reduce costs of the tubing, such that their manufacture does not require complicated and expensive tooling in order to manufacture the tubing.

BRIEF SUMMARY

Embodiments of the invention described herein thus provide waste and water tubes designed for particular use on board an aircraft of other passenger transport vehicle. The tubes are manufactured from alternate materials than those that are presently used and are intended to offer cost savings benefits, lower the weight of the system, and provide easier methods to provide tubes having varying curved radii and other shapes that are not typically available with the waste and water tube materials currently in use.

BRIEF DESCRIPTION OF THE DRAWINGS

FIG. 3 shows an example of a mandrel. FIG. 4 shows a liner applied to the mandrel. FIG. 5 shows a pre-impregnated fiber wound around the liner. FIG. 6 shows a shrink tube placed over the tube. FIG. 7 shows the shrink tube sealed with vacuum tape. FIG. 8 shows a vacuum bag at each end.

DETAILED DESCRIPTION

Embodiments of the present invention provide water and waste tubes that may be manufactured from alternate materials. The tubes are designed to meet the same requirements as the titanium, CRES, and hose equivalents but to also save additional weight, allow for more complex geometry, and potentially save cost. The alternate materials from which the waste and water tubes may be made include but are not limited to composite materials such as thermoplastic or thermoset materials, with or without reinforcing fibers.

The current bent water and waste tubes used on an aircraft are bent to standard radii (per manufacturing capabilities). The routing of tubes in an aircraft is designed for these limited radii. To create a more detailed bend or varying radii of CRES or titanium tubes is either expensive or not possible. The present inventors have determined that it would be desirable to manufacture waste and/or water tubes from composite materials. The composite tubes developed and described herein are generally not limited to the standard bend radii used for traditional metal waste and water tubes, but instead, they allow for more efficient routing by using variable radius bends, splines, multi-axial bends, corkscrews, and so forth. The complex geometry available will also allow for replacement of some hoses with composite tubes.

Materials. In one embodiment, one or more thermoplastic materials may be used to form the tube body. Such materials may include but are not limited to PVC-type piping, but would use engineered thermoplastic tube materials such as polyethylenimine (PEI), polyphenylene sulfide (PPS), polyphenylsulfone (PPSU), polyether ether ketone (PEEK), polyetherketone ketone (PEKK), polyvinylidene fluoride (PVDF), or any other appropriate thermoplastic material or any combination thereof, along with aerospace style connections (AS1650 or similar). In an alternate embodiment, thermoset material may be used, such as epoxy, vinyl ester, or any other appropriate thermoset material or any combination thereof. One non-limiting example of an epoxy that may be used is Aerotuf 275-34™.

The thermoplastic and/or thermoset materials may be used with fibers, such as carbon fiber, fiber glass, Kevlar, nomex, or any other appropriate fiber or any combination thereof. The fibers may be continuous or short fibers and may be uni-directional, woven, braided or a combination of these. Depending on the process selected, the fibers could be dry with resin (thermoplastic or thermoset) being introduced at the time of part lay up or pre-impregnated fiber(s) could be used.

The liner/interior surface of waste tubes may be a film adhesive (such as 3M AF30 or similar) to comply with chemical requirements. Water tubes may have a liner of polyethylene terephthalate (PETG), polytetrafluoroethylene (PTFA) or similar material in order to comply with potable water requirements.

Figure 1:
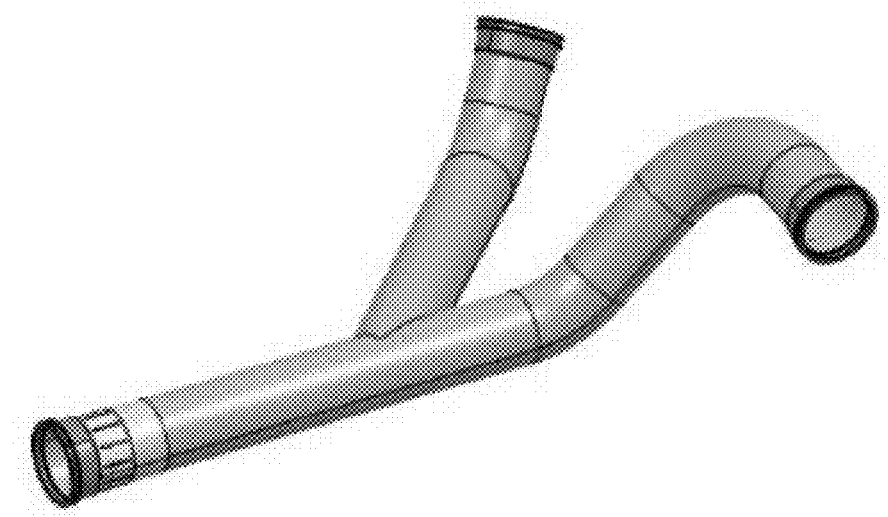
FIG. 1 shows a side perspective view of a traditional waste tube.
Figure 2:
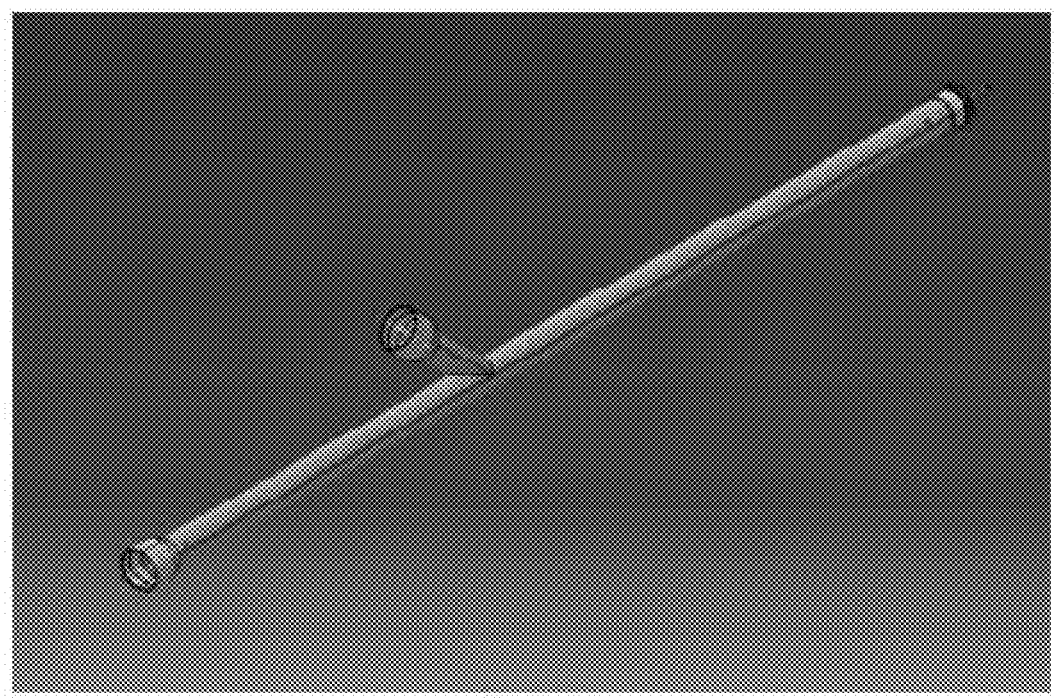
FIG. 2 shows a side perspective view of a traditional water tube.
Figure 3:
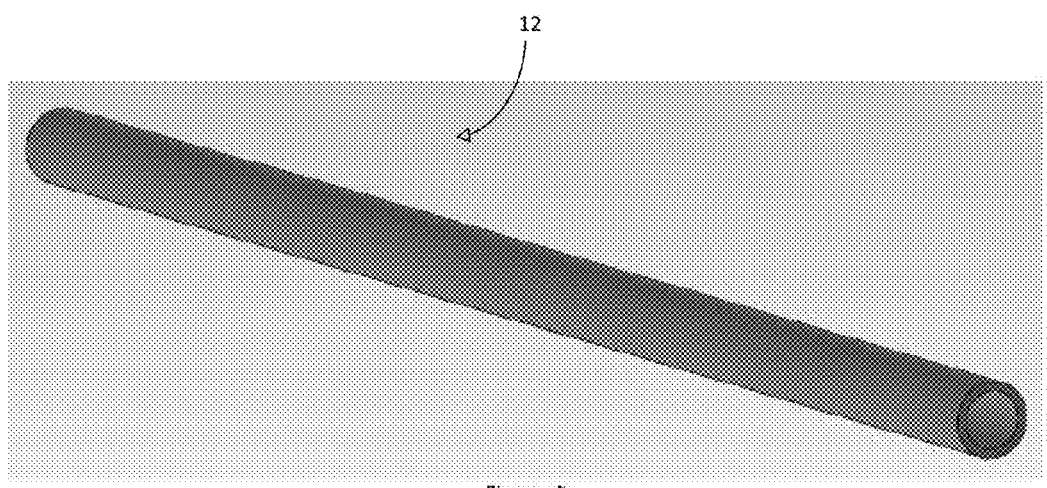
FIGS. 3-8 show steps for manufacturing a composite tube according to one embodiment of the invention.
Figure 4:
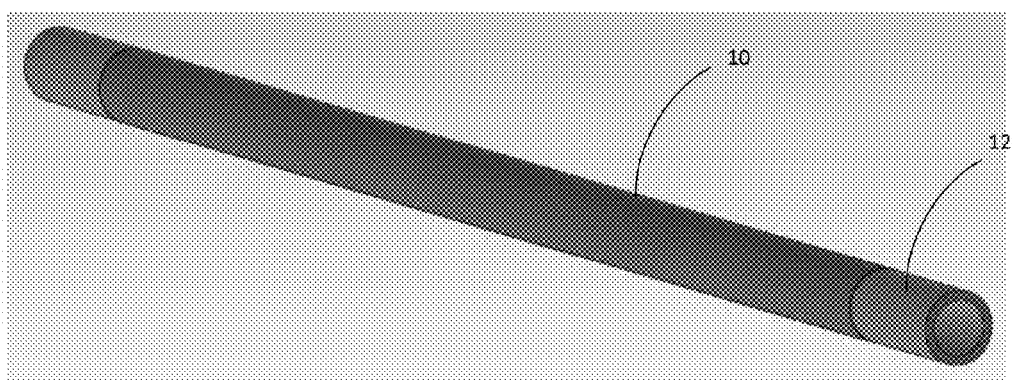
Figure 5:
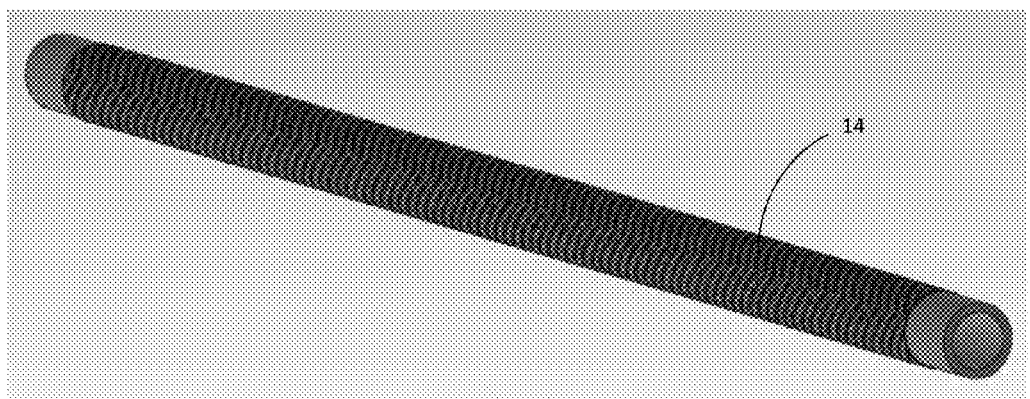
Figure 6:
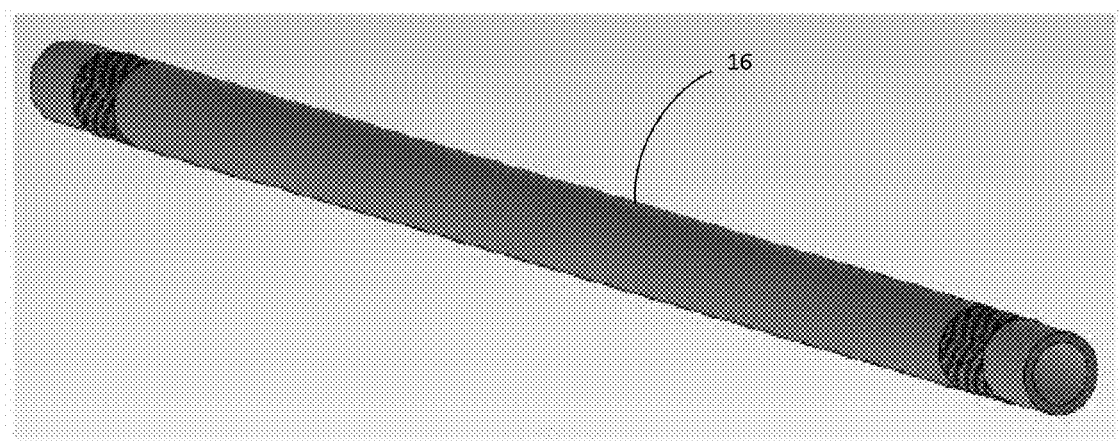
Figure 7:
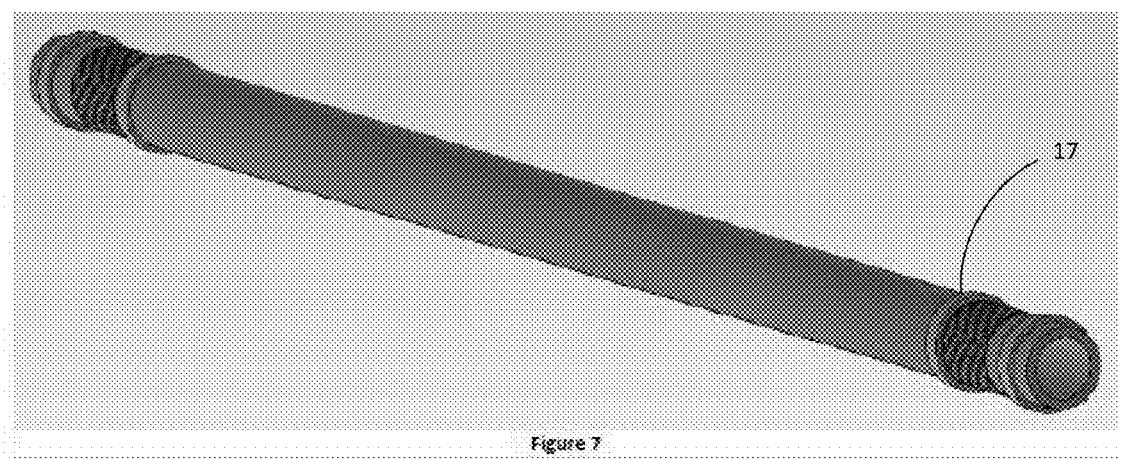
Figure 8:
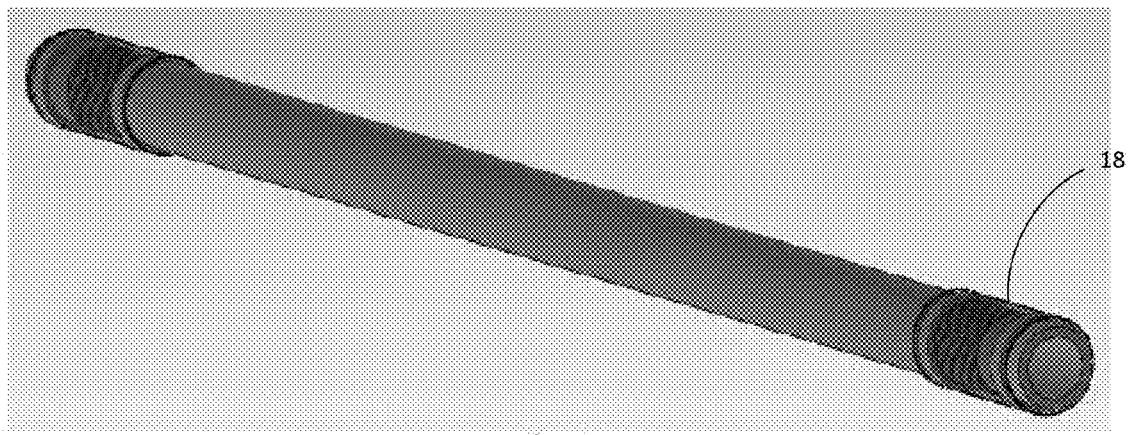

Tooling/manufacturing process. In one embodiment, straight composite tubes may be manufactured by placing a liner 10 of 3M AF30™ (a thermosetting film adhesive) or similar material (for waste tubes) or PETG or similar material (for water tubes) on a metal or plastic mandrel 12, as shown in FIGS. 3-4. A pre-impregnated fiber 14 is then applied over the liner by filament winding or roll wrapping. In one specific embodiment, the fiber may be a fibeX™ fiber system. An example of a mandrel 12 is shown in FIG. 3, and the liner 10 as applied is shown in FIG. 4. FIG. 5 shows the pre-impregnated fiber 14 wound around the liner. The configuration is then vacuum bagged, shrink taped, or shrink tubed and cured in an oven or autoclave. As shown in FIG. 6, a shrink tube 16 may then be placed over the tube lay up and shrunk at a temperature below the cure temperature of the pre-impregnated fiber. Once shrunk, the shrink tube 16 itself is sealed with vacuum tape 17 and a vacuum bag 18 at each end, as shown in FIGS. 7-8. Thus, the shrink tube becomes the vacuum bag. The configuration is then cured in an oven or autoclave. Vacuum could be pulled from one of the vacuum bags 18 applied over the shrink tube onto the mandrel. After cure, the vacuum bag or shrink tube and any other process materials are removed from the part and discarded. The part can be pulled off the mandrel. If necessary, the part and mandrel can be placed in a freezer. The mandrel will shrink due to the temperature and the part can be removed. After part removal, the ends of the tube will be trimmed to length. End fittings (similar to AS1653 or other connection type) are bonded to the tube ends.

An alternative method is to use an inflatable silicone mandrel, apply the liner and composite and insert into a mold cavity. The silicone mandrel could be pressurized to press the composite into the tooled surface. This is similar to the SMART tooling described below but would not require the shape memory materials.

Other processes for making tubes could include resin transfer molding (RTM), vacuum assisted resin transfer molding (VARTM), structural reaction injection molding (SRIM), and/or high speed resin transfer molding (HSRTM). These are variations of wetting out reinforcing fiber with resin (thermoplastic or thermoset). A pre-impregnated fiber (woven, uni-direction, braid or a combination of these) may be used to lay up the tube instead of using a resin infusion.

However, bent tubes and/or tubes with a pullout cannot be made on a hard mandrel (interior tool), as the tooling will be trapped. The curvature of the tube makes removal of t the tooling difficult to impossible. Accordingly, a further manufacturing method is needed is order to provide the desired shapes, if they are other than straight—which is more often than not the case for water and waste tubes, which must curve with the aircraft architecture. One solution for making bent and wye tubes is to use SMART Tooling from Spintech Ventures, LLC or similar process, which uses shape memory materials to create an interior mold which is soft and conformable at high temperatures. A bladder is made and placed in a mold. As temperature is increased, the bladder is pressurized with air. When the bladder softens, it is pushed against the mold and then cooled. Once cooled, it is rigid in the shape of the mold. Composite materials can be laid up and then placed in a final part mold. Heat and air pressure are applied, and as the bladder softens, it pushes the composite against the exterior mold. Once the part is cured, the bladder (still soft at high temperatures) can be removed. This process could also be used to make straight tubes. However, SMART tooling can be expensive.

Accordingly, a second solution for making bent or wye tubes is to use 3D printing technology. One example of a system that may be used is the Fortus 3D Production System by Stratasys or similar. This system is used to actually first print a 3D model of the interior of the desired tube shape using a soluble material. The material is basic (i.e., it has a high pH). The desired shape can be printed in any diameter, shape, or configuration, depending upon the specifications of the particular water or waste tube to be used and its location for intended use on the aircraft. Post processing of the material is done to achieve a smooth surface of the 3D printed tool. The composite material can then be laid up on the exterior of the 3D printed tool (a pre-impregnated fiber, a braid, vacuum infusion, or any other option) and cured in an oven or autoclave. Once the composite material is cured, the tool/part is dipped in an acidic solution (low pH) which dissolves the 3D printed soluble material. When removed from the bath, only the composite tube remains. (This process could also be used to make straight tubes.) One primary benefit of this method is that there is not a need to create expensive tooling to form a curved or wye tube. By designing the 3D shape in advance, printing the 3D shape and then applying the desired material, any number of options can be designed and/or tested.

Figure 9:
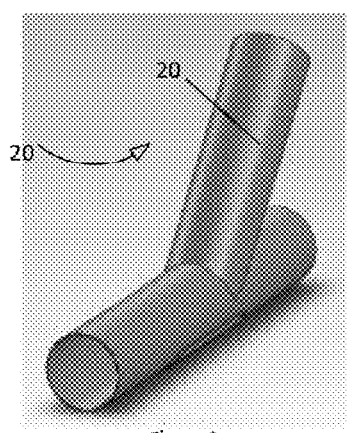
FIG. 9 shows one embodiment of a wye/pullout tube.
Figure 10:
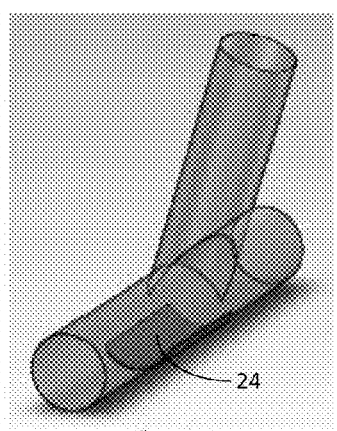
FIG. 10 shows the tube of FIG. 9 with an impact pad positioned therein.
Figure 11:
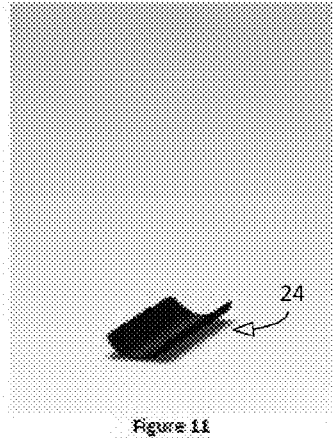
FIG. 11 shows a side perspective view of the impact pad of FIGS. 9-10.
Figure 12:
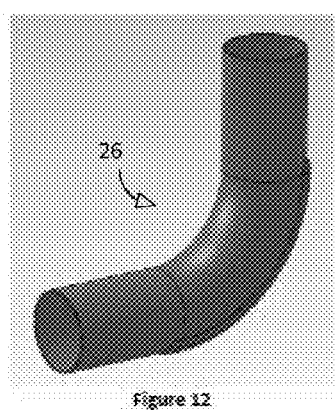
FIG. 12 shows a bent tube section.
Figure 13:
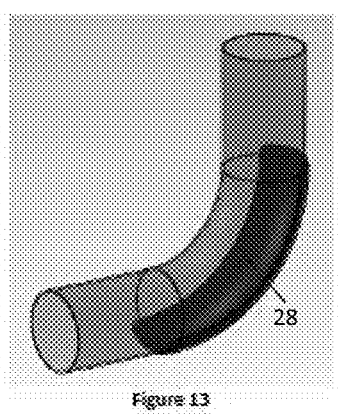
FIG. 13 shows the tube of FIG. 12 with an impact pad positioned therein.
Figure 14:
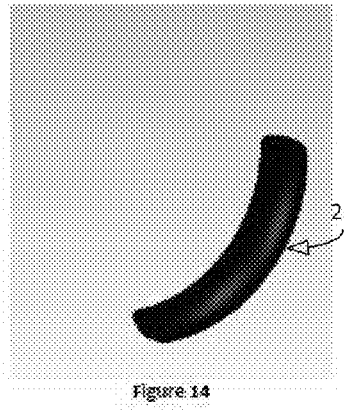
FIG. 14 shows a side perspective view of the impact pad of FIGS. 12-13.
Figure 16:
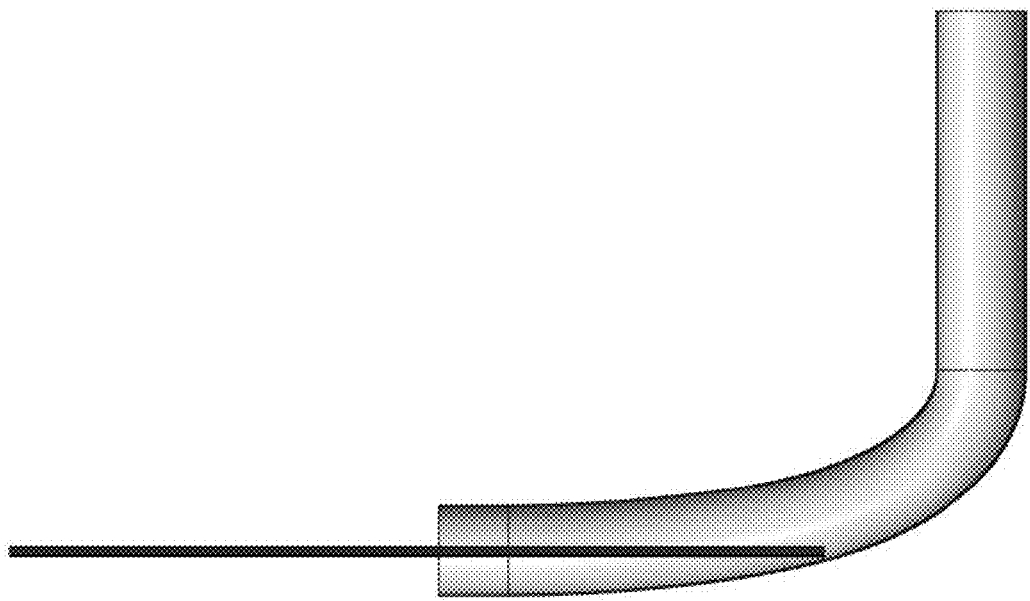
FIG. 16 shows a variable radius bend of a tube according to methods described herein, and illustrates the lower angle of impact of a potential projectile.

Because most long fiber composites do not have the impact strength of metals, consideration must be taken to meet impact requirements for waste tubes. In addition to variable radius bends as shown in FIG. 16, impact areas (typically bends and sections where wyes or pullouts enter a straight section) can be made with thicker sections of the same material used in the rest of the tube. This increased strength and stiffness may help to minimize any damage from projectiles. In an alternate embodiment, a plate of impact resistant material is inlaid in the tube (once formed or during tube manufacture) to absorb this impact without damaging the material around it. Non-limiting exemplary materials for such a plate may include but are not limited to be plates formed from polyarylsulphones (PPSU), polycarbonates (PC), titanium, CRES, or any other appropriate material or combinations thereof. FIG. 9 illustrates a wye/pullout section 20 of a potential tube 22. FIG. 10 shows a transparent view an impact pad 24 positioned in the wye/pullout tube 22. FIG. 11 illustrates one example of a potential shape and size for an impact pad 24. FIGS. 12-14 show similar views of a bent tube section 26 having a differently shaped impact pad 28 positioned therein.

Figure 15:
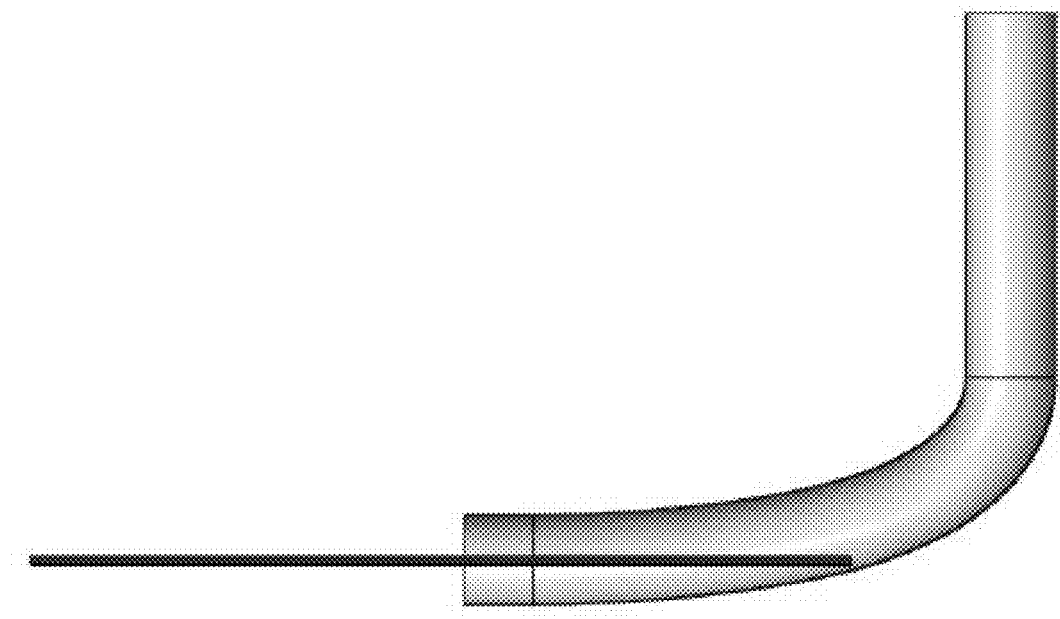
FIG. 15 shows an example of a typical constant radius bent tube, and illustrates the angle of impact of a potential projectile.

One of the benefits of using composite materials for manufacturing waste and water tubes is that they allow various types of bends and radii, providing more design flexibility than the traditional current tubes that are available. They are also easier to manufacture, and provide the option of varying radii and more curvatures. These types of bends could also be used to lower the angle of impact (larger entry radii), thus reducing the impact energy. For example, FIG. 15 shows a typical constant radius bend for a tube. The incoming line represents the path of a projectile travelling into the bend. The impact angle of the projectile in this scenario is about 30°. FIG. 16 shows a variable radius bend. The impact angle of the project in this scenario is reduced to about 18°. One reason this is beneficial because composite materials do not have the impact resistance of the titanium or CRES tubes. The lower angle that can be formed, however, will translate to less impact energy being imparted onto the composite tube. Typical methods used for waste or water tube manufacturing are generally not able to provide such a variable radius bend without adding a great deal of cost to the manufacturing process.

Additionally, the thermal conductivity of the composite materials described herein is lower than CRES or titanium, which will make freezing of water in lines less likely. This is an important benefit for aircraft use, in particular, as the proper drainage of aircraft water tubes is of particular concern in order to prevent standing water from freezing and causing the tubes to burst. Further, heating foil or wires can be laid up integrally to the composite tubes described here, or inline heaters may also be installed.

The composite tubes described herein may also be manufactured with varying cross sections (such as circular or non-circular, including but not limited to oval, D-shaped, C-shaped, curved and flat surface, flat-sided, with a corkscrewed interior or exterior, or any combination thereof) in order to optimize air and waste flow through the system or to accommodate installation in the aircraft. For example, potential cross sections could be oval, triangular or rectangular. The tubes may even have varying shapes, such as corkscrews or other options. For example, internal fins or projections may be provided in the interior of the tubes in order to guide or assist with water and/or waste flow due to the ease of manufacturing options provided by 3D printing. In fact, this new use of the above-described 3D printing technology in order to form aircraft waste and water tubes is particularly useful in manufacturing tubes having these varied cross-sections and bends, curves, and non-straight alternate shapes.

Changes and modifications, additions and deletions may be made to the structures and methods recited above and shown in the drawings without departing from the scope or spirit of the invention and the following claims.

What is claimed is:

1. A composite tube for use in a waste or water system on board a passenger transport vehicle, the tube comprising:
   a. a tube body comprising a thermoplastic or thermoset material;
   b. one or more fiber materials incorporated into the tube body;
   c. wherein the tube has at least one bend comprising a thicker section that is reinforced such that impact resistance at the bend in the tube is greater than along other portions of the tube.

2. The tube of claim 1, wherein the tube is manufactured using 3D printing technology.

3. The tube of claim 1, wherein the tube has a non-circular cross-section.

4. The tube of claim 3, wherein the cross section comprises an oval, D-shaped, C-shaped, curved and flat surface, flat-sided, corkscrewed cross section, or any combination thereof.

5. The tube of claim 1, wherein the thermoplastic or thermoset material of the tube body comprises polyethylenimine, polyphenylene sulfide, polyphenylsulfone, polyether ether ketone, polyetherketone ketone, polyvinylidene fluoride, or any combination thereof.

6. The tube of claim 1, wherein the thermoplastic or thermoset material of the tube body comprises epoxy, vinyl ester, or any combination thereof.

7. The tube of claim 1, wherein the fiber materials comprise carbon fiber, fiber glass, Kevlar, nomex, or any combination thereof.

8. The tube of claim 1, wherein the fiber materials are continuous fibers, short fibers, uni-directional, woven, braided, or any combination thereof.

9. The tube of claim 1, wherein the thicker section comprises an impact pad at the bend in the tube.

10. The tube of claim 9, wherein the impact pad comprises polyarylsulphones, polycarbonates, titanium, CRES, or any combination thereof.

11. The tube of claim 1, wherein the thicker section comprises a thicker section of the same material of the tube positioned at the bend in the tube.

* * * * *